(12) United States Patent
Mons

(10) Patent No.: US 6,991,433 B2
(45) Date of Patent: Jan. 31, 2006

(54) DRUM, IN PARTICULAR A DRUM FORMING A TURBOMACHINE ROTOR, A COMPRESSOR, AND A TURBOSHAFT ENGINE INCLUDING SUCH A DRUM

(75) Inventor: Claude Mons, Savigny le Temple (FR)

(73) Assignee: Snecma Moteurs, Paris (FR)

( * ) Notice: Subject to any disclaimer, the term of this patent is extended or adjusted under 35 U.S.C. 154(b) by 120 days.

(21) Appl. No.: 10/667,652

(22) Filed: Sep. 23, 2003

(65) Prior Publication Data

US 2005/0254950 A1 Nov. 17, 2005

(30) Foreign Application Priority Data

Oct. 2, 2002 (FR) .................................. 02 12169

(51) Int. Cl.
*F01D 19/02* (2006.01)
(52) U.S. Cl. .................................. 416/201 R; 416/215
(58) Field of Classification Search ............ 416/198 R, 416/201 R, 198 A, 215–218, 244 A
See application file for complete search history.

(56) References Cited

U.S. PATENT DOCUMENTS

| | | | | |
|---|---|---|---|---|
| 3,532,438 A | * | 10/1970 | Palfreyman et al. | .... 416/213 R |
| 3,554,667 A | * | 1/1971 | Wagle | ......................... 416/217 |
| 3,610,777 A | * | 10/1971 | Wagle | ..................... 416/198 R |
| 5,820,347 A | | 10/1998 | Bussonnet et al. | |
| 6,213,720 B1 | * | 4/2001 | Farmer | .................... 416/229 A |
| 6,290,455 B1 | * | 9/2001 | Hemmelgarn et al. | ......... 415/9 |
| 6,406,263 B1 | * | 6/2002 | Meacham et al. | .......... 416/194 |

FOREIGN PATENT DOCUMENTS

FR 2 699 099 6/1994
GB 2 265 671 10/1993

* cited by examiner

*Primary Examiner*—Edward K. Look
*Assistant Examiner*—Devin Hanan
(74) *Attorney, Agent, or Firm*—Oblon, Spivak, McClelland, Maier & Neustadt, P.C.

(57) ABSTRACT

The drum of the invention is generally in the form of a body of revolution about a longitudinal axis, being made of a metal alloy and extending between an upstream end and a downstream end along a curved profile capable of being circumscribed in an annular envelope extending around said longitudinal axis, said profile extending radially about a surface of revolution presenting a generatrix line, said downstream end being provided with a stiffener. In characteristic manner, said stiffener is provided with at least one composite assembly mounted on said downstream end, said composite assembly comprising fibers and a polymer matrix. The drum is preferably for use in constituting a rotor of a low pressure compressor.

20 Claims, 3 Drawing Sheets

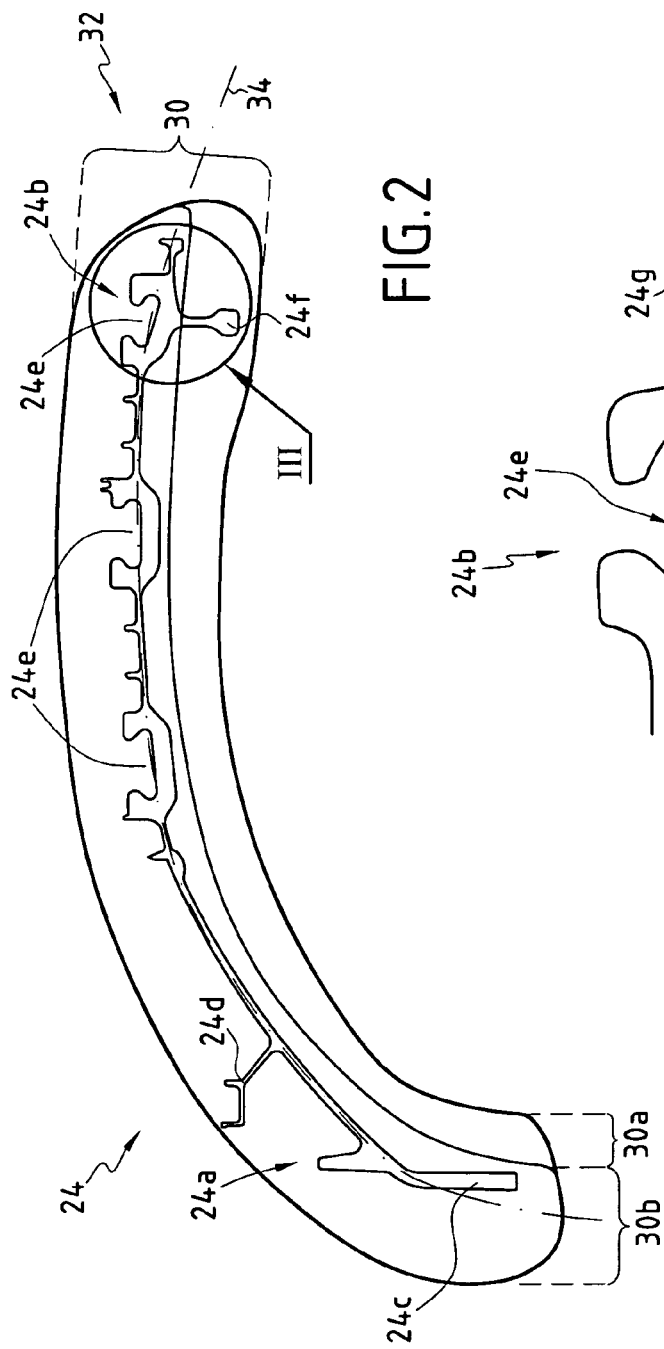
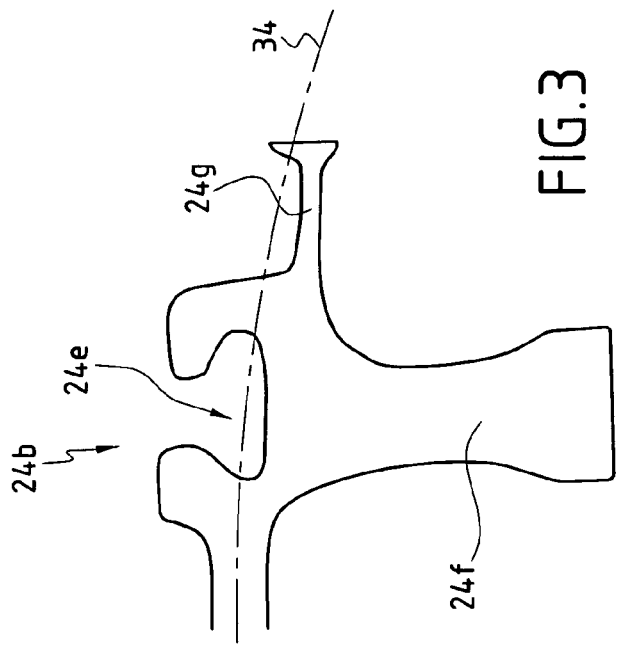

DRUM, IN PARTICULAR A DRUM FORMING A TURBOMACHINE ROTOR, A COMPRESSOR, AND A TURBOSHAFT ENGINE INCLUDING SUCH A DRUM

The invention relates to a turbomachine rotor, in particular for aviation purposes.

More particularly, the present invention relates to making a single-block drum for a turbomachine rotor, in particular for an axial type compressor, specifically a low pressure compressor. The adjective "single-block" is used to mean a drum made as a single piece or as a plurality of parts bonded together in rigid manner.

BACKGROUND OF THE INVENTION

Compressors of this type, which are used in particular in turbojet engines, are constituted by a rotor which instead of comprising a succession of separate disks stacked one after another, comprises a single drum for receiving the series of blades of different stages.

Conventionally, the single drum has recesses or retention grooves machined therein, in a disposition that leaves gaps between adjacent stages for receiving the blades of the stator stages that are secured to a fixed portion presenting a casing.

The blades are usually secured individually to the drum in a corresponding number of housings that are regularly distributed and of shape that is determined to be complementary to the shape of the blade root so as to prevent the blade from moving radially, for example by providing fastening of the dovetail type. To prevent the root of a blade moving in translation relative to its housing, in particular in the axial direction, there is generally provided a respective blocking system for each blade constituted by a ball, a pin, a clip, a flange, a spacer, etc.

The rotor of a compressor to which the invention applies comprises a metal drum of the single-block type made by machining a rough forged piece which is fitted with a downstream stiffener needed to damp radial deformations, i.e. to enable the drum to withstand stresses, in particular radial compression stresses that are exerted while the turbomachine is in operation.

The stiffener is formed by a radial protrusion constituting an inwardly-directed radial projection (i.e. projecting towards the longitudinal axis), thereby forming a zone presenting sufficient radial thickness to provide the necessary strength, this zone constituting a portion having a bore of diameter that is generally smaller than in the remainder of the drum.

Such drums are usually made of a titanium-based alloy which withstands the thermal and mechanical stresses to which turbomachine rotors are subjected.

In aviation applications, where manufacturers are constantly attempting to reduce weight, this type of blade-carrying drum is made with small thickness in the radial direction, whether in the zones for retaining the blade roots or in the zones corresponding to the recesses.

Nevertheless, in spite of such a shape of small thickness, it is necessary to begin by making a forging that is relatively thick, with this large thickness being due in particular to the downstream portion that contains the stiffener. Obtaining such a forging therefore requires a large quantity of raw material to be used, giving rise to large costs in terms of raw materials and subsequent machining, with material being lost during machining in the form of swarf.

Another technique serves to avoid the need to have recourse to a thick forging: it consists in welding on a separate piece for forming the stiffener, in particular by electron beam welding. Nevertheless, that technique requires both that an additional piece be made by forging and then machining, and that a lengthy and expensive welding operation be performed.

OBJECTS AND SUMMARY OF THE INVENTION

An object of the present invention is to provide a drum while avoiding the problems mentioned above that occur in the prior art.

To this end, the present invention provides a drum supporting blades, the drum being generally in the form of a body of revolution about a longitudinal axis and being intended in particular to form a rotor, the drum being made of a metal alloy and extending between an upstream end and a downstream end along a curved profile that can be circumscribed in an annular envelope extending around said longitudinal axis, said profile extending radially around a surface of revolution presenting a generatrix line, said downstream end being provided with a stiffener.

According to the invention, said stiffener is provided with at least one composite assembly mounted on said downstream end, said composite assembly comprising fibers and a polymer matrix.

It will thus be understood that the presence of said composite assembly means that a material is used in the location of said stiffener that is at least as strong as said metal alloy, but that is lighter in weight. Such a stiffener is also easy to implement.

This solution thus presents numerous advantages, mainly in terms of method of manufacture (reducing raw materials and machining costs), and also in terms of the weight of the drum obtained in this way.

Preferably, the drum comprises a first portion made as a single piece of metal and a second portion forming said stiffener. Advantageously, the drum of the invention comprises these two pieces only, thereby producing the solution that is the most advantageous economically and that is entirely satisfactory from the point of view of ability to withstand stresses, both mechanical and thermal.

In a first embodiment of the drum of the present invention, said downstream end defines an annular housing coaxial about said longitudinal axis, said housing being radially open towards the outside, and said composite assembly is annular and wound around said downstream end, being positioned in said housing. This solution makes it possible to obtain a single stiffener that provides the drum with overall reinforcement against forces, in particular centrifugal forces directed radially outwards, and tending to deform the drum.

In a second embodiment of the drum of the present invention, said downstream end forms a series of axial protrusions, and said stiffener is formed by at least one wound composite assembly in the form of a sleeve mounted on one of said protrusions. This solution, which uses as many composite assemblies wound into the shape of sleeves as there are protrusions, provides the advantage, in the event of one or more of the composite assemblies being damaged, of making it possible to replace locally only the damaged composite assembly(ies).

Advantageously, said stiffener is off-centered relative to said generatrix line, and in particular said stiffener is off-centered radially outwards relative to said generatrix line: this solution improves effectiveness during stressing due to rotation of the drum.

In a preferred disposition, said composite assembly is made of long carbon fibers wound and received in a matrix of thermosetting resin, preferably of the epoxy type.

The present invention also provides an axial centrifugal compressor comprising, as its rotor, a drum of the above-specified type with moving blades fixed thereto.

Finally, the present invention also provides a combustion turboshaft engine, in particular a turbojet engine, including a compressor of the above-specified type.

BRIEF DESCRIPTION OF THE DRAWINGS

Other advantages and characteristics of the invention appear on reading the following description made by way of example and with reference to the accompanying drawings, in which:

FIG. 2 is on a larger scale and shows a half-view of the FIG. 1 drum;

FIG. 3 is an enlarged detail of the downstream end of the FIG. 2 drum, showing the stiffener;

MORE DETAILED DESCRIPTION

Figure 1:
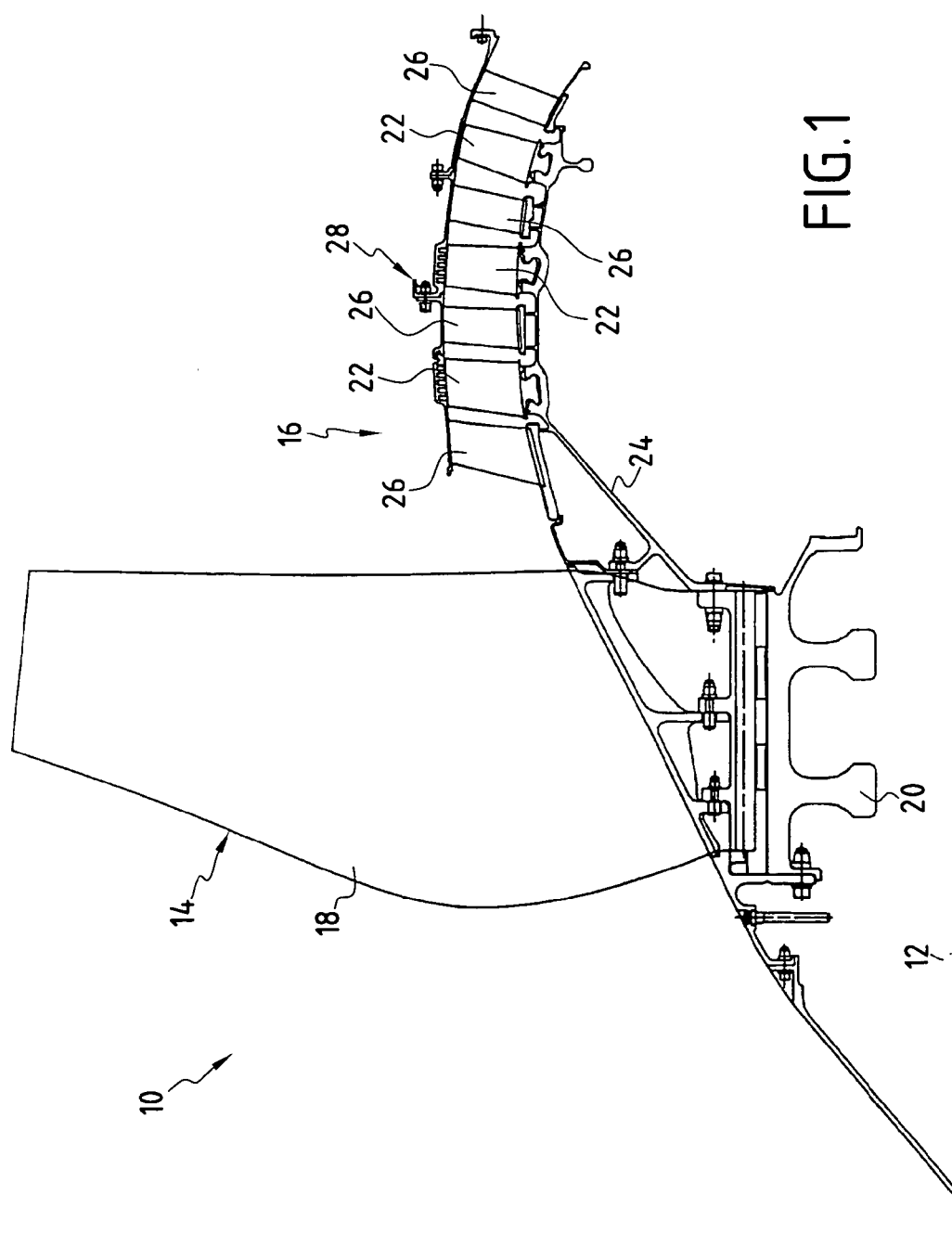
FIG. 1 is a half-view, partially in section, of the front portion of a turbojet engine, with the fan and the low pressure compressor fitted with a prior art drum.

FIG. 1 is a section of half of the front portion 10 of a turbojet engine, this half being situated on one side of the longitudinal axis 12 that forms the axis of symmetry about which the various elements rotate, in particular the various moving elements of the turbojet engine.

More precisely, amongst the various elements disposed axially around the longitudinal axis 12 and forming the conventional structure of such a turbojet engine, FIG. 1 shows both a fan 14 and a compressor 16 that operates at low pressure.

The fan 14 comprises a series of blades 18 that extend radially and that are mounted on an annular disk 20: only one such blade 18 appears in FIG. 1. It should be understood that the disk 20 and the blades 18 are mounted to rotate about the longitudinal axis 12 of the turbojet engine.

In FIG. 1, the air flow direction defines an upstream end (to the left in FIG. 1) and a downstream end (to the right in FIG. 1).

Naturally, for reasons of clarity, other conventional elements of such a turbojet engine are not shown, and in particular elements that are situated further downstream than the compressor 16, and elements that are situated further out radially from the longitudinal axis 12 are not shown.

The compressor 16 comprises a plurality of series of rotary blades 22 mounted on a disk or drum 24 that is secured to the fan disk 20.

FIG. 1 shows three series of moving blades 22 mounted between five series of stationary blades 26 mounted on a casing 28.

The drum 24 which can be seen more clearly in FIG. 2 is thus generally in the form of a body of revolution about the longitudinal axis 12 extending from an upstream end 24a to a downstream end 24b situated to the right of FIG. 2. The upstream end 24a is shaped to enable it to be secured to the annular disk 20 of the fan 14 (see FIG. 1) e.g. by means of bolts co-operating with flanges 24c and 24d.

Between the upstream end 24a and the downstream end 24b, the single-block drum 24 has three sets of recesses 24e for receiving the roots of the moving blades 22 which are complementary in shape.

As can be seen more clearly in FIG. 3 which is an enlargement of the downstream end 24b, a stiffener 24f is formed radially, extending the recess 24e situated at the downstream end of the drum 24.

In the prior art, this stiffener 24f is constituted by a radial extension, i.e. a protrusion, directed towards the longitudinal axis 12 so as to form an inside annular rib which significantly increases the mechanical strength of the drum 24, in particular against radial compression forces.

In conventional manner, the downstream end 24b is terminated by an annular axial protrusion 24g extending the stiffener 24f and the portion defining the recess 24e situated at the downstream end of the drum 24 in an axial direction.

With reference to FIG. 2, the drum 24 presents a profile going from its upstream end 24a towards its downstream end 24b that can be contained in an annular envelope 30 about the longitudinal axis 12.

More precisely, the profile of revolution of the drum 24 extends on opposite sides of a mean surface of revolution generated by rotating a curved generatrix line 34 about the longitudinal axis 12.

As can be seen in FIG. 2, prior art drums do not depart significantly in a radial direction from said generatrix line 34 except in certain zones: the fixing flanges 24c and 24d and the stiffener 24f.

Conventionally, the drum 24 is made from a single forging which requires a circular ingot to be made, generally by casting, and having approximately the shape and the volume occupied by the annular envelope 30 that can be seen in FIG. 2.

If this annular envelope 30 is subdivided into a radially inner envelope portion 30a which corresponds to the quantity of material that needs to be present for subsequently constituting the stiffener 24f, and a radially outer envelope portion 30b corresponding to the remainder of the envelope 30, it can readily be seen that the omission of the stiffener 24f from the initial casting enables a significant quantity of raw material to be saved, which quantity can be estimated as being about one-third.

Starting from this observation, the present invention serves to modify the prior art stiffener 24f using the solution shown in FIGS. 4A to 5B.

In the description below, which relates to the present invention, prior art elements as described above are given the same reference numbers plus 100.

As can be see in the figures, the prior art stiffener 24f is completely omitted and has been replaced by a composite assembly 140 mounted on the downstream end 124b.

The present invention relies on using a composite material comprising fibers and a polymer matrix in order to form a stiffener having sufficient ability to withstand mechanical and thermal stresses so as to enable it to take the place of the prior art stiffener 24f made of metal.

The fibers are preferably wound long fibers giving the composite assembly 140 a high degree of mechanical strength, in particular in terms of stiffness. It is preferable to use carbon fibers, but other types of fiber could also be used, including fibers of boron, silicon, boron carbide, and silicon carbide.

The polymer matrix serves to form a composite assembly 140 that is of low density while presenting a degree of mechanical resilience. It is preferable to use resins of the epoxy type; it is also possible to use polyimide resins or resins based on nylon or on polybenzimidazole for making the composite assembly 140.

Figure 4A:
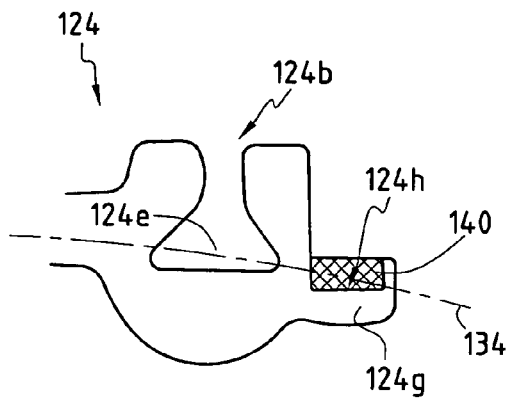
FIGS. 4A and 4B show two variants of a drum constituting a first embodiment of the invention.
Figure 4B:
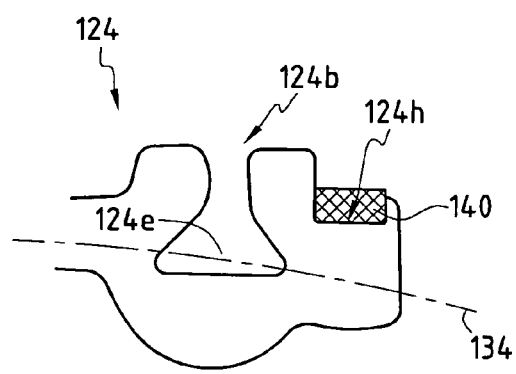

In a first embodiment shown in FIGS. 4A and 4B, the annular axial protrusion 24g forming the portion of the drum that is situated furthest downstream defines a circular annular housing 124h around the longitudinal axis 12, this housing 124h being open in a radially outward direction, i.e. facing away from the longitudinal axis 12, so as to be capable of receiving the composite assembly 140.

In a first variant shown in FIG. 4A, the annular housing 124h extends on both sides of the generatrix line 134.

In a second variant shown in FIG. 4B, the housing 124h is offset outwards from the generatrix line 134: in this way, the wound composite assembly 140 constituting the stiffener is off-centered relative to the generatrix line 134. This preferred solution serves to improve the mechanical strength performance of the drum that presents such an arrangement.

Figure 5A:
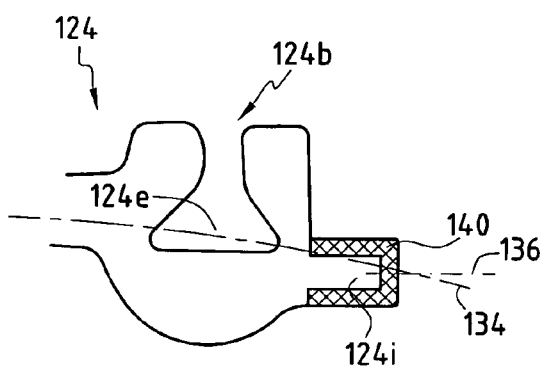
FIGS. 5A and 5B show two variants of a drum constituting a second embodiment of the invention.
Figure 5B:
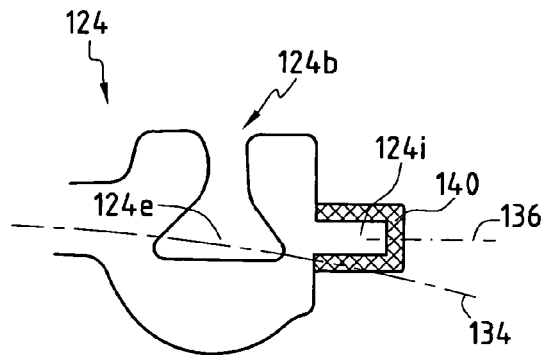

In a second embodiment shown in FIGS. 5A and 5B, the furthest downstream portion of the downstream end 124b presents multiple axial protrusions 124i which are regularly spaced apart radially along the longitudinal axis 12.

Each of these axial protrusions 124i is designed to receive a wound composite assembly 140 which is wound in the form of a sleeve around said protrusion 124i.

The sleeve formed by the wound composite assembly 140 may have an opening at each of its ends, or in preferred manner, as shown in FIGS. 5A and 5B, it may present a U-shape longitudinal section engaged around the axial protrusion 124i.

The sleeve may be circularly cylindrical about the axis 136 that is parallel to the longitudinal axis 12, or it may present a cross-section that is elongate, e.g. being oval, oblong, or the like.

In a first variant of the second embodiment, as shown in FIG. 5A, the axial protrusions 124i together with the wound composite assemblies 140 are centered about the generatrix line 134.

In the second variant of the second embodiment as shown in FIG. 5B, the axial protrusions 124i together with the sleeves forming the wound composite assemblies 140 are off-centered, i.e. offset, relative to the generatrix line 134 away from the longitudinal axis 12 in order to improve performance in terms of mechanical strength.

Naturally, in both embodiments, provision is made for winding the long fibers of the wound composite assembly 140 either directly about the longitudinal axis 12 (FIGS. 4A and 4B), or else about respective axes 136 parallel to said longitudinal axis 12 and constituting the central axes of the wound composite assemblies 140 that constitute sleeves (FIGS. 5A and 5B).

It will also be understood that the present invention makes it possible to provide a drum 124 of cost that is much less than that of a prior art drum while still being capable of being manufactured simply so as to present characteristics such as characteristics of ability to withstand thermal and mechanical stresses that are at least as good as those of prior art drums.

What is claimed is:

1. A drum configured to form a rotor to support several rows of blades exposed to a flow of air from an upstream end of the drum to a downstream end thereof, the drum being a single-block drum generally in the form of a body of revolution about a longitudinal axis, the drum being made of a metal alloy and extending between said upstream end and said downstream end along a curved profile circumscribed in an annular envelope extending around said longitudinal axis, said profile extending radially around a surface of revolution presenting a generatrix line, said downstream end being provided with a stiffener, wherein said stiffener comprises at least one composite assembly mounted only on said downstream end, said composite assembly comprising fibers and a polymer matrix.

2. The drum according to claim 1, comprising a first portion made as a single piece of metal and a second portion forming said stiffener.

3. The drum according to claim 1, wherein said downstream end defines an annular housing coaxial about said longitudinal axis, said housing being radially open towards the outside, and wherein said composite assembly is annular and wound around said downstream end, said composite assembly being positioned in said housing.

4. The drum according to claim 1, wherein said downstream end forms a series of axial protrusions, and wherein said stiffener is formed by at least one wound composite assembly in the form of a sleeve mounted on one of said protrusions.

5. The drum according to claim 1, wherein said stiffener is off-centered relative to said generatrix line.

6. The drum according to claim 5, wherein said stiffener is off-centered radially outwards relative to said generatrix line.

7. The drum according to claim 1, wherein said composite assembly is formed by wound carbon fibers received in a matrix of thermosetting resin.

8. The drum according to claim 7, wherein said thermosetting resin is of the epoxy type.

9. An axial compressor comprising, at a rotor of the compressor, the drum according to claim 1 with moving blades fixed thereon.

10. A turbojet engine, comprising the axial compressor in accordance with claim 9.

11. The drum according to claim 1, wherein said composite assembly comprises an opening at each end thereof.

12. The drum according to claim 4, wherein said composite assembly comprises a U-shape longitudinal section engaged around the at least one of said protrusions.

13. The drum according to claim 4, wherein said composite assembly comprises a cross section that is circular, oval, or oblong about an axis parallel to the longitudinal axis.

14. The drum according to claim 1, wherein said composite assembly comprises carbon fibers, boron fibers, silicon fibers, boron carbide fibers, or silicon carbide fibers.

15. The drum according to claim 14, wherein said composite assembly is formed by winding said fibers in a matrix comprising an epoxy resin, a polyimide resin, a nylon-based resin, or a polybenzimidazole resin.

16. A drum configured to form a rotor of a compressor of an aircraft engine compressing an air flow from an upstream to a downstream end of the drum, the drum being a metallic single-block drum generally in the form of a body of revolution about a longitudinal axis, the drum comprising:
    means for damping deformations of the drum effected by stresses generated during operation of the aircraft engine, said means being disposed in the downstream end of the drum and comprising fibers and a polymer matrix.

17. The drum according to claim 16, wherein said means comprises a composite assembly formed by wound carbon fibers in a matrix of thermosetting resin.

18. The drum according to claim 17, wherein said thermosetting resin is an epoxy resin.

19. An axial compressor comprising, at a rotor thereof, the drum according to claim 16 having moving blades fixed thereon.

20. A turbojet engine comprising the axial compressor according to claim 19.

* * * * *